E. A. BRUNS.
COMBINATION TANK AND HOSE ATTACHMENT.
APPLICATION FILED MAY 29, 1918.
1,369,390.
Patented Feb. 22, 1921.
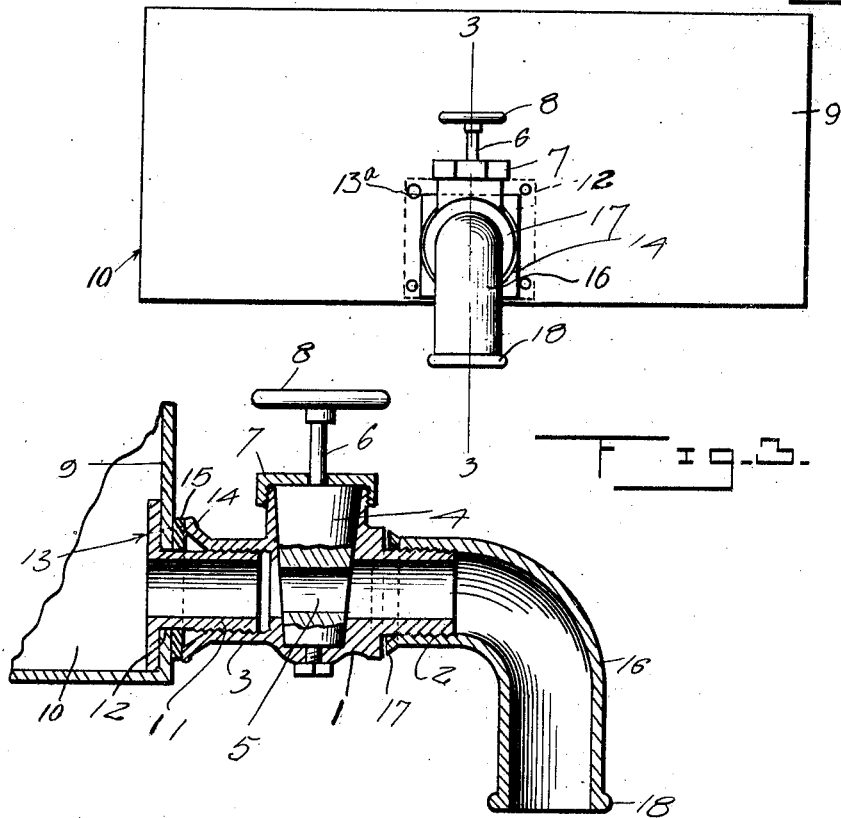
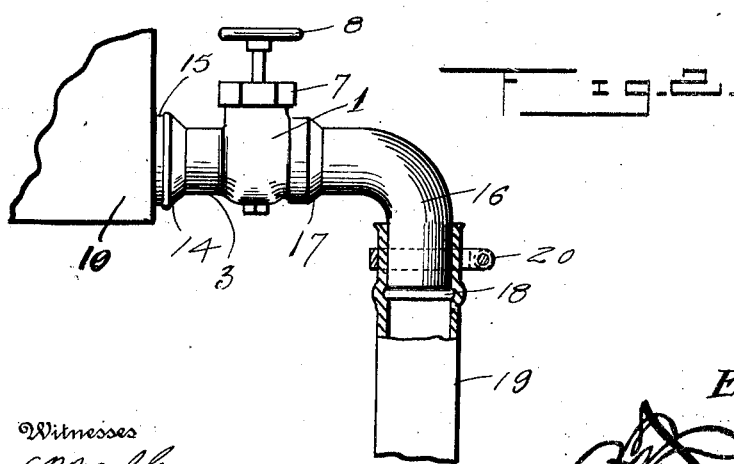
Witnesses
C. R. Bealle.
J. F. Byrne
Inventor
E. A. Bruns.
By
Attorney

UNITED STATES PATENT OFFICE.

EMMA A. BRUNS, OF RICETON, SASKATCHEWAN, CANADA.

COMBINATION TANK AND HOSE ATTACHMENT.

1,369,390.  Specification of Letters Patent.  Patented Feb. 22, 1921.

Application filed May 29, 1918. Serial No. 237,277.

*To all whom it may concern:*

Be it known that I, EMMA A. BRUNS, a subject of the King of Great Britain, residing at Riceton, in the Province of Saskatchewan and Dominion of Canada, have invented certain new and useful Improvements in Combination Tank and Hose Attachments; and I do hereby declare the following to be a full, clear, and exact description of the invention, such as will enable others skilled in the art to which it appertains to make and use the same.

My invention relates to improvements in faucets and its primary object is the provision of a novel device of this character adapted to connect a hose to the water storage tank of a windmill.

A further object of the invention is the provision of a faucet of the above stated character which shall be equipped with means adapted to establish a rigid, strong and non-leakable connection between the faucet and one wall of the water storage tank.

A still further object of the invention is the provision of a faucet of the above stated character with a bib or nozzle which is adapted to have one end of a hose connected thereto and which is rotatably mounted upon the body so that the hose may be swung without danger of kinking about the body as an axis.

With the above and other objects in view, the invention consists in the construction, combination and arrangement of parts hereinafter fully described and claimed, and illustrated in the accompanying drawing, wherein—

Figure 1 is a view in front elevation of a water storage tank equipped with a faucet constructed in accordance with my invention.

Fig. 2 is a side elevation of the faucet and a fragmentary portion of the water storage tank, and Fig. 3 is a section on the vertical plane indicated by the line 3—3 of Fig. 1.

Referring to the drawing by reference numerals, 1 designates the body of my improved faucet. The body is hollow and is provided at its front side with a forwardly extending externally threaded projection 2. At its rear side, the body is provided with a rearwardly extending internally screw threaded projection 3. A turning plug 4 is mounted in the body 1 and is provided with a port or passage 5 adapted to be moved into and out of registration with the projections 2 and 3. The turning plug 4 is provided with a stem 6 which passes through a cap nut 7 adapted to retain the turning plug within the body 1. At its outer end the stem 6 is provided with a hand wheel 8.

The faucet is adapted to be connected to the vertical wall 9 of a water storage tank 10 by means of a nipple 11 upon which the extension 3 is mounted. The nipple 11 passes through an opening 12 located in the wall 9 adjacent the bottom of the water storage tank 10, and has its inner end provided with a flange 13 adapted to bear against the inner side of the wall 9. The flange 13 is secured in place by rivets 13ª, as clearly shown in Fig. 1 of the drawing. The outer end of the nipple 11 is threaded for engagement with the threads of the extension 3, and the rear end of the extension 3 is flared outwardly as at 14 to provide a flange adapted to engage a gasket 15 mounted upon the nipple 11 against the outer side of the wall 9. The flanges 13 and 14, and the gasket 15, establish a rigid, strong and non-leakable connection between the faucet and the wall 9 of the water storage tank 10.

The bib or nozzle 16 is of elbow formation and has its upper end provided with internally arranged screw threads for the reception of the projection 2. The threaded connection between the bib or nozzle 16 and the projection 2 is such that the nozzle may be rotated once upon the projection 2 in either a clockwise or counter-clockwise direction without disconnecting the nozzle from the projection or without bringing the end of the nozzle in contact with the body 1. The inner end of the bib or nozzle 16 is flared as at 17 to facilitate the application of the bib or nozzle to the projection 2. The other end of the bib or nozzle 16 is provided with a shoulder 18 over which one end of a hose 19 is stretched. The hose 19 is secured to the bib or nozzle 16 against accidental displacement by a suitable clamp 20. A suitable gasket, not shown, may be mounted upon the projection 2 between the body 1 and the flared end 17 of the bib or nozzle 16 to establish a water-tight connection between the projection and the bib or nozzle.

As the bib or nozzle may be freely rotated once in either a clockwise or counter-clockwise direction with relation to the body, the hose may be moved from place to place without kinking, whereby to insure the free passage of water through the hose at all times.

It should be apparent from the above description, taken in connection with the accompanying drawing, that I provide a faucet which has a rigid, strong, durable and non-leakable connection with the tank and which will permit the hose to be freely moved without danger of kinking. It should also be apparent that the nozzle is simple, durable and efficient and that it may be manufactured and sold at a comparatively low cost.

While I have shown and described the preferred embodiment of my invention, it will be understood that minor changes in the construction, combination and arrangement of parts may be made without departing from the spirit and scope of the invention as defined by the claim.

Having thus fully described my invention, what I claim as new and desire to protect by Letters Patent, is:

A tank and a hose attachment comprising a valve body, a forward extension formed on said body and externally screw threaded, a nozzle adapted to be attached to a hose and threaded on the extension and capable of turning once in either direction in relation to the extension, a rear extension formed on said body and internally screw threaded and having its end flared, a plug having a passage mounted for rotation in the body, a nipple extending through the wall of a tank and threaded in the rear extension, a flange formed on the end of the nipple and secured to the inner face of the wall of the tank, and a gasket mounted on the nipple and forced into engagement with the outer face of the wall of the tank by the flared end of the rear extension and may have its pressure increased against the wall by adjusting the rear extension on said nipple.

In testimony whereof I affix my signature in presence of two witnesses.

EMMA A. BRUNS.

Witnesses:
L. M. PLACE,
FRED GILBES.